United States Patent
Singh et al.

(10) Patent No.: US 6,737,035 B1
(45) Date of Patent: May 18, 2004

(54) HETEROGENITE MATERIAL FOR MAKING SUBMICRON COBALT POWDERS

(75) Inventors: Raj P. Singh, Sayre, PA (US); Robert G. Mendenhall, Waverly, NY (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/652,485

(22) Filed: Aug. 31, 2000

(51) Int. Cl.$^7$ ................................................ C01G 51/04
(52) U.S. Cl. .......................................... 423/592; 75/252
(58) Field of Search ............................. 423/592; 75/252

(56) References Cited

U.S. PATENT DOCUMENTS

| | | | |
|---|---|---|---|
| 4,218,240 A | 8/1980 | Gingerich et al. | 75/0.5 AA |
| 4,469,505 A | 9/1984 | Cheresnowsky et al. | 75/0.5 BA |
| 4,798,623 A | 1/1989 | Cheresnowsky | 75/0.5 AA |
| 5,744,259 A * | 4/1998 | Ohta et al. | 429/59 |
| 5,984,982 A * | 11/1999 | Wei et al. | 29/623.1 |
| 6,015,447 A | 1/2000 | Gorge et al. | 75/255 |
| 6,054,110 A * | 4/2000 | Yamada et al. | 423/592 |
| 6,103,213 A * | 8/2000 | Nakamura et al. | 423/592 |

FOREIGN PATENT DOCUMENTS

| | | | |
|---|---|---|---|
| CA | 2188815 | | 4/1997 |
| JP | 62-128911 | * | 6/1987 |
| JP | 10-188970 | * | 7/1998 |
| JP | 11-60242 | * | 3/1999 |
| JP | 11-176433 | * | 7/1999 |
| JP | 2002-321922 | * | 11/2002 |

OTHER PUBLICATIONS

Irani, Riyad et al., Particle Size: Measurement, Interpretation, and Application, John Wiley & Sons, 1963, p. 128.*
Mineral Data Sheet for Heterogenite–2H.*

* cited by examiner

*Primary Examiner*—George Wyszomierski
(74) *Attorney, Agent, or Firm*—Robert F. Clark

(57) ABSTRACT

A high-surface-area heterogenite ($HCoO_2$) material is described for use in making submicron cobalt metal powders. The $HCoO_2$ material has a surface area of at least about 90 $M^2/g$ and is preferably produced by dehydrating a cobalt hydroxide precipitate at 110° C.

2 Claims, 2 Drawing Sheets

HETEROGENITE MATERIAL FOR MAKING SUBMICRON COBALT POWDERS

TECHNICAL FIELD

This invention relates to cobalt compounds and methods of making cobalt powders. In particular, this invention relates to $HCoO_2$ (heterogenite) and methods for making submicron cobalt powders.

BACKGROUND ART

Submicron particle size (<1 $\mu$m) cobalt powders exhibit distinct advantageous properties over larger, micron size (>1 $\mu$m) powders. For example, in tungsten carbide applications, submicron size cobalt particles greatly improve sinterability and mass transport at temperatures significantly below the sintering temperatures required for micron-size cobalt powders. Typically, submicron cobalt metal powder is made via thermal decomposition of cobalt oxalate ($CoC_2O_4$). However, this method is not very efficient as $COC_2O_4$ contains only 40 wt. % Co compared to 53.6 wt. % Co in $Co(OH)_3$. Hence, it would be advantageous to use a compound having a higher cobalt content such as cobalt hydroxide to make submicron cobalt powders.

U.S. Pat. No. 4,218,240 teaches the conversion of $Co(OH)_3$ to a micron-size cobalt metal powder having a FSSS value of 1.3–1.4 $\mu$m. Impure $CoCl_2$ in solution is converted to $Co(NH_3)_6Cl_3$ which is then converted to $Co(OH)_3$ by decomposition with NaOH. Cobalt powder is produced by direct reduction of the wet cobalt hydroxide in hydrogen at 300–500° C. Although the patent describes air drying of the $Co(OH)_3$ at 100° C. to form a hydrated cobaltic oxide, it also teaches that air drying is not necessary prior to reducing the cobalt containing precipitate. No sub-micron powders are described.

SUMMARY OF THE INVENTION

It is an object of the invention to obviate the disadvantages of the prior art.

It is another object of the invention to provide a high-cobalt-content precursor material for making submicron cobalt metal powders.

In accordance with the objects of this invention, there is provided a heterogenite powder having a surface area of at least about 90 $m^2$/g.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

It was discovered that a high surface area $HCoO_2$ (heterogenite) material could be made by drying a wet cobalt hydroxide precipitate at a moderate temperature of 110° C. The surface area as measured by the conventional BET method was at least about 90 $m^2$/g and preferably about 90 $m^2$/g to about 110 $m^2$/g. The high surface area $HCoO_2$ is then be reduced under a hydrogen-containing atmosphere to form submicron-size cobalt metal powders. Preferably, the $HCoO_2$ is reduced at a temperature from about 325° C. to about 425° C. for about 0.5 hours to about 2.0 hours. The particle size of the resultant cobalt metal powders ranges from 0.4 to 0.9 $\mu$m as determined by Fisher Sub-Sieve Sizer (FSSS). The $HCoO_2$ contains about 64 wt. % Co.

Figure 1:
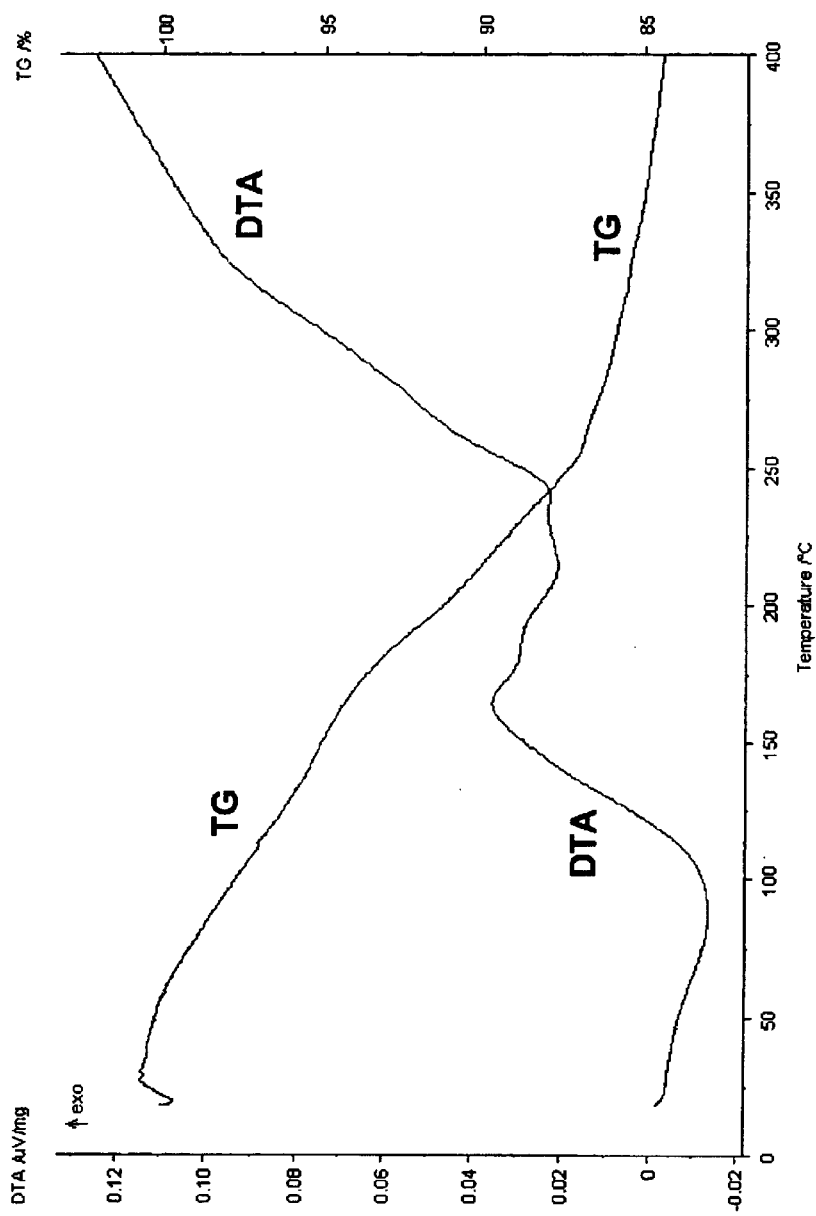
FIG. 1 is a TG-DTA curve of a room-temperature-dried $Co(OH)_3$ precipitate.

A wet cobalt hydroxide precipitate may be made by decomposing $Co(NH_3)_6Cl_3$ with NaOH as described in U.S. Pat. No. 4,218,240. The wet cobalt hydroxide, $Co(OH)_3$, which contains about 30–32 weight percent (wt. %) Co, may be represented by the chemical formula $Co(OH)_3.4H_2O$. After drying at room temperature, it converts to a compound which may be represented as $HCoO_2.xH_2O$ where 0<x<1. The room-temperature-dried $Co(OH)_3$ precipitate is a layered compound wherein water molecules reside between layers of $HCoO_2$. After heating at 110° C., the room-temperature-dried $Co(OH)_3$ precipitate looses all of its water molecules and converts to $HCoO_2$. This change is illustrated in FIG. 1 which is a TG-DTA curve of a room-temperature-dried $Co(OH)_3$ precipitate. The water loss from the room-temperature-dried $Co(OH)_3$ precipitate is marked by an endothermic peak in the differential thermal analysis (DTA) curve at about 110° C. Upon further heating to greater than above 150° C., the $HCoO_2$ converts to cobalt oxide, $Co_3O_4$.

The following non-limiting examples are presented.

EXAMPLE 1

Figure 2:
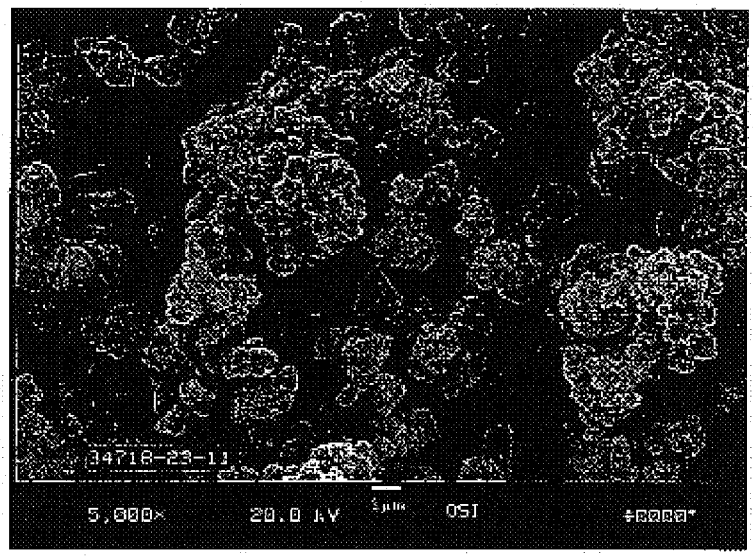
FIG. 2 is an SEM photomicrograph of the heterogenite powder of this invention.

Wet cobalt hydroxide was dried at various temperatures: ambient temperature (24–25° C.), 110° C. and 316° C. These temperatures were selected on the basis of a differential thermal analysis (DTA) of $Co(OH)_3$. $HCoO_2$ was obtained after heating wet $Co(OH)_3$ at 110° C. The presence of $HCoO_2$ was confirmed by x-ray diffraction (XRD). The compound contained about 62–63.2 wt. % cobalt and possessed a high surface area of 90–110 $m^2$/g (BET method). Scanning electron micrographs of $HCoO_2$ powders (e.g., FIG. 2) demonstrated that it contained aggregates of very fine particles.

EXAMPLE 2

Figure 3:
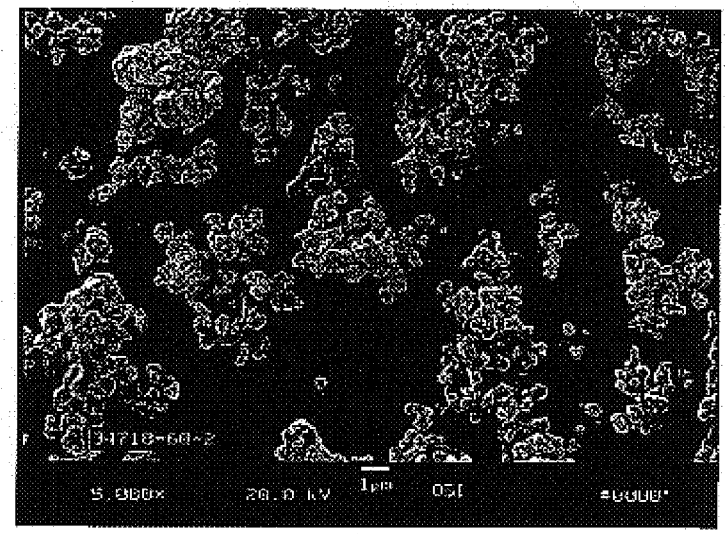
FIG. 3 is an SEM photomicrograph of the submicron cobalt powder made from the heterogenite powder of this invention.

The $HCoO_2$ powder made in Example 1 was placed into two graphite boats, which were placed in a tube furnace. The samples were reduced at 400° C. in hydrogen (10 SCFH flow rate) using a 4° C./min temperature gradient and 2 hour reduction time. The resulting cobalt metal powder was characterized by SEM and other methods. The cobalt powder was submicron size having a FSSS of 0.87 $\mu$m. This is significantly lower than 1.3–1.4 $\mu$m size of cobalt particles produced according to the method in U.S. Pat. No. 4,218,240. The morphology of the particles is presented in FIG. 3. Powder porosity was 0.812 and the BET surface area was 1.97 $m^2$/g.

EXAMPLE 3

The $HCoO_2$ powder made according to Example 1 was reduced as in Example 2 except that no temperature gradient was used. The resultant cobalt powder had a FSSS of 0.78$\mu$, a porosity of 0.825 and a BET surface area of 2.07 $m^2$/g.

EXAMPLE 4

The $HCoO_2$ powder made according to Example 1 was reduced at 350° C. in hydrogen (10 SCFH flow rate) for 2 hour using a 4° C./min temperature gradient. The resultant cobalt powder had a FSSS of 0.65 μm, a porosity of 0.856, and a BET surface area of 2.19 $m^2/g$.

EXAMPLES 5–12

The following examples demonstrate the effect of time, temperature and hydrogen flow rate on the size of the cobalt metal powders produced from the high surface area $HCoO_2$.

| Examples | Time (h) | Temp (° C.) | $H_2$-Flow Rate (SCFH) | FSSS (μm) |
|---|---|---|---|---|
| 5 | 1 | 375 | 10 | 0.55 |
| 6 | 1 | 375 | 10 | 0.64 |
| 7 | 1.5 | 325 | 15 | 0.4 |
| 8 | 0.5 | 425 | 15 | 0.76 |
| 9 | 1.5 | 425 | 15 | 0.94 |
| 10 | 1.5 | 425 | 5 | 0.75 |

-continued

| Examples | Time (h) | Temp (° C.) | $H_2$-Flow Rate (SCFH) | FSSS (μm) |
|---|---|---|---|---|
| 11 | 0.5 | 425 | 5 | 1.05 |
| 12 | 1 | 375 | 10 | 0.68 |

While there has been shown and described what are at the, present considered the preferred embodiments of the invention, it will be obvious to those skilled in the art that various changes and modifications may be made therein without departing from the scope of the invention as defined by the appended claims.

We claim:

1. A heterogenite powder having a surface area at of least about 90 $m^2/g$.

2. The heterogenite powder of claim 1 wherein the surface area is from about 90 $m^2/g$ to about 110 $m^2/g$.

* * * * *